United States Patent
Mendez Hernandez (10) Patent No.: US 9,882,368 B2
(45) Date of Patent: Jan. 30, 2018

(54) SYSTEMS AND METHODS TO DETECT AN ELECTRIC ARC AND A LIGHTNING STRIKE

(71) Applicant: General Electric Company, Schenectady, NY (US)

(72) Inventor: Yaru Najem Mendez Hernandez, Munich (DE)

(73) Assignee: General Electric Company, Niskayuna, NY (US)

(*) Notice: Subject to any disclaimer, the term of this patent is extended or adjusted under 35 U.S.C. 154(b) by 1127 days.

(21) Appl. No.: 14/068,893

(22) Filed: Oct. 31, 2013

(65) Prior Publication Data

US 2015/0118046 A1   Apr. 30, 2015

(51) Int. Cl.
*H02G 13/00* (2006.01)
*F03D 80/30* (2016.01)

(52) U.S. Cl.
CPC ............ *H02G 13/00* (2013.01); *F03D 80/30* (2016.05); *Y02E 10/72* (2013.01)

(58) Field of Classification Search
CPC .. G11B 5/3903; G01V 3/104; G01R 33/0358; G01R 33/0283; G01R 33/028; G01R 33/02; G01L 23/14; H02G 13/00; F01D 21/003; F03D 80/30; F03D 17/00; F03D 80/00; H02H 1/0015
See application file for complete search history.

(56) References Cited

U.S. PATENT DOCUMENTS

| | | | |
|---|---|---|---|
| 5,745,081 A | 4/1998 | Brown et al. | |
| 6,313,810 B1 | 11/2001 | Andersson et al. | |
| 6,747,459 B2 | 6/2004 | Parker et al. | |
| 6,922,059 B2 | 7/2005 | Zank et al. | |
| 7,806,657 B2 | 10/2010 | Schram et al. | |
| 7,988,415 B2 | 8/2011 | Hardison et al. | |
| 8,327,710 B2 | 12/2012 | Koste et al. | |
| 8,462,481 B2 | 6/2013 | Lambert et al. | |
| 2007/0041834 A1* | 2/2007 | Schram | F03D 80/30 416/61 |
| 2011/0265575 A1* | 11/2011 | Koste | F03D 80/30 73/660 |

FOREIGN PATENT DOCUMENTS

WO    2010012765 A1    2/2010

OTHER PUBLICATIONS

Brian McNiff, "Wind Turbine Lightning Protection Project", National Renewable Energy Laboratory; NREL/SR-500-31115 May 2002, 100 Pages.

Peesapati, "Lightning Protection of Wind Turbines", EPSRC Engineering and Physical Sciences and Research Council, EWEC 2010, 17 Pages.

* cited by examiner

*Primary Examiner* — Dwayne J White
*Assistant Examiner* — Justin A Pruitt
(74) *Attorney, Agent, or Firm* — Nitin N. Joshi (57) ABSTRACT

An electric arc detection system is presented. The electric arc detection system comprises a receiving antenna that receives electromagnetic radiation generated by an electric arc formed in an internal cavity of a non-conductive hollow structure, and a processing subsystem for determining an existence of the electric arc in the internal cavity based upon signals representative of the electromagnetic radiation.

19 Claims, 6 Drawing Sheets

SYSTEMS AND METHODS TO DETECT AN ELECTRIC ARC AND A LIGHTNING STRIKE

BACKGROUND

Rotor blades of wind turbines have become increasingly susceptible to lightning strikes, as the rated electric power of the wind turbines and the dimensions of the rotor blades have increased. A lightning strike may adversely impact the condition of a wind turbine. For example, the lightning strike may damage rotor blades of the wind turbine by carbonizing or puncturing the surface of the rotor blades. Furthermore, the lightning strike and its associated intense electric field activity may form electric arcs inside the rotor blades that may increase the temperature inside the rotor blades and damage the rotor blades. The damage may deteriorate the functionality and/or lifetime of the rotor blade, and may further provide a preferred path to a further lightning strike.

Conventional systems have been proposed to protect rotor blades of wind turbines from adverse effects of lightning strikes. In one such system, for example, a rotor blade of a wind turbine is equipped with one or more metal lightning receptors, so-called air termination systems, located on the outer surface of the rotor blade, the metal receptors of the rotor blade are electrically coupled to a respective down-conductor that is installed within the interior of the rotor blade, and the down-conductor of the rotor blade is coupled to an earthed conductor that is coupled to the earth (ground). In the event of a lightning strike on a metal receptor, a lightning current is received by the metal receptor, and flows to the down-conductor. Due to the electrical coupling of the down-conductor to the earthed conductor and its low impedance, the lightning current flows from the down-conductor into the earthed conductor and thereafter flows into the earth.

One challenge for metal receptor based systems is that the lightning may not always strike the metal receptors. For example, the lightning may strike the surface of the rotor blade that is generally made of a non-conductive composite material. The strike of the lightning on the surface may puncture the surface of the rotor blade. The punctured surface then creates a path for the initial or a further lightning strike to enter into an internal cavity of the rotor blade. Before, during and, after lightning strikes into the internal cavity, an electric field may be generated inside the internal cavity and ionize air inside the internal cavity. The ionization of the air may result in formation of electric arcs or partial discharges in the form of streamers inside the internal cavity between a surface of the rotor blade and the down-conductor. The electric arcs may further be formed in the form of leaders along an inside surface or an inside layer of the rotor blade and generate pressure shock waves that may destroy the surface and other portions of the rotor blade. Furthermore, electric arcs tend to increase the temperature inside the rotor blade, thereby causing additional damage to the rotor blade.

Another possible cause of electric arc formation in rotor blades may be electrostatic charging of the rotor blades. The electrostatic charging may occur when there is an increased activity of storm clouds and stormy weather, for example.

Therefore, it would be advantageous to provide improved systems to detect lightning strikes and to determine the presence of electric arcs in rotor blades of wind turbines.

BRIEF DESCRIPTION

An electric arc detection system is presented. The electric arc detection system comprises a receiving antenna that receives electromagnetic radiation generated by an electric arc formed in an internal cavity of a non-conductive hollow structure, and a processing subsystem for determining an existence of the electric arc in the internal cavity based upon signals representative of the electromagnetic radiation.

A wind turbine system is presented. The wind turbine system comprises a wind turbine hub, a plurality of rotor blades, each of the plurality of rotor blades comprising a respective root and a respective tip at opposite sides along a respective longitudinal axis, a plurality of radio frequency antennas, each of the plurality of radio frequency antennas located inside the wind turbine hub and inside a root of a respective rotor blade of the plurality of rotor blades and positioned to receive radio frequency waves generated by one or more electric arcs in a respective internal cavity of the respective rotor blade, and a processing subsystem for determining an existence of the one or more electric arcs in the respective internal cavity of the plurality of rotor blades based upon the radio frequency waves.

A method is presented. The method comprises determining an existence of an electric arc in an internal cavity of a non-conductive hollow structure based upon radio frequency waves generated by the electric arc.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The term "coupled" is not restricted to physical or mechanical connections or couplings, and can include electrical connections or couplings, whether direct or indirect. Furthermore, the term "processor" may include either a single component or a plurality of components, which are either active and/or passive and are connected or otherwise coupled together to provide the described function.

Example embodiments of the present invention are described primarily in the context of rotor blades in wind turbines. However, the embodiments of the present invention are not limited to rotor blades in wind turbines, and include any electrically non-conductive hollow structure, with a partially enclosed or contained volume. The non-conductive hollow structure, for example, may be partially hollow or completely hollow. By way of a non-limiting example, the non-conductive hollow structure may comprise a rotor blade of a wind turbine, a hollow structure used to form a wing, fuselage, or tail of an aircraft, or a hollow structure used to form a radome for an antenna. The non-conductive hollow structure may comprise an electrically conductive or nonconductive coating. The non-conductive hollow structure may comprise a respective internal cavity that is fully or partially enclosed by an outer covering.

In various embodiments of the present invention, the existence of an electric arc in a non-conductive hollow structure is determined based upon electromagnetic radiation generated by the electric arc. In a more specific embodiment, the existence of the electric arc in the non-conductive hollow structure is determined based upon radio frequency waves generated by the electric arc. The occurrence of a lightning strike on the non-conductive hollow structure may further be determined based upon the existence and nature of the electric arc. The condition of the non-conductive hollow structure may further be assessed based upon the radio frequency waves generated by the electric arc.

Figure 1:
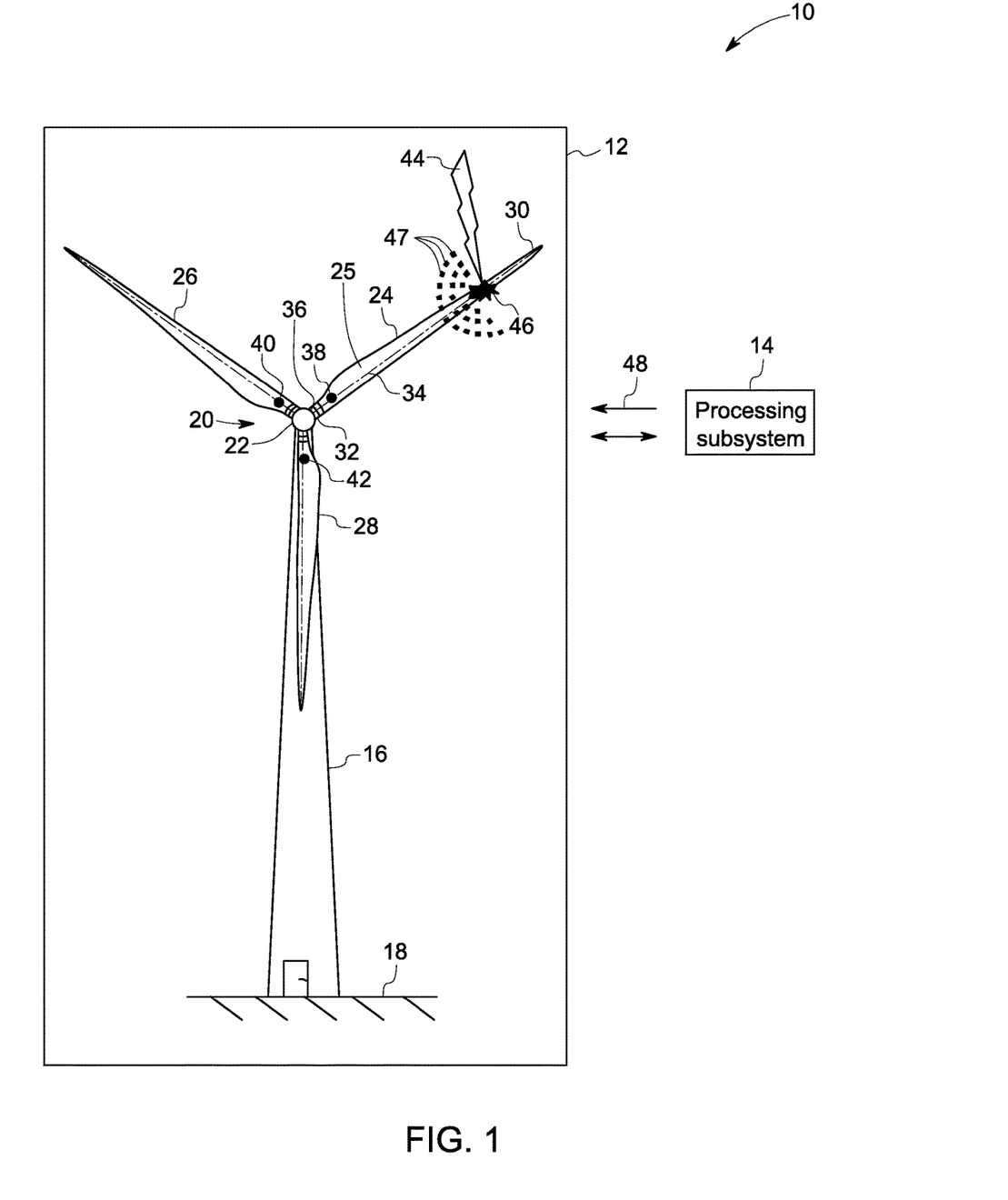
FIG. 1 is a perspective view of an exemplary wind turbine system including a processing subsystem for determination of the existence of an electric arc in a rotor blade, in accordance with one embodiment of the present invention.

Although FIG. 1 depicts wind turbine rotor blades, the embodiments described in FIG. 1 may be used in other non-conductive hollow structures for detection of electric arcs and determination of the occurrence of a lightning strike. FIG. 1 is a perspective view of an exemplary wind turbine system 10 including an electric arc 46 in a rotor blade 24 of a wind turbine 12, in accordance with one embodiment of the present invention. In the exemplary embodiment, the wind turbine system 10 comprises the wind turbine 12 operationally coupled to a processing subsystem 14. In the embodiment of FIG. 1, the wind turbine 12 comprises a horizontal-axis wind turbine. Alternatively, the wind turbine 12 may comprise a vertical-axis wind turbine. In the exemplary embodiment, the wind turbine 12 includes a tower 16 that extends from a support system 18, a nacelle (not shown) mounted on the tower 16, and a rotor 20 that is coupled to the nacelle. The rotor 20 includes a rotatable hub 22 and rotor blades 24, 26, 28 coupled to and extending outward from the hub 22. In the configuration of FIG. 1, the rotor 20 has three rotor blades 24, 26, 28. In an alternative embodiment, the rotor 20 includes more or less than three rotor blades 24, 26, 28. The rotor blades 24, 26, 28 comprise a non-conductive material. By way of a non-limiting example, the rotor blades 24, 26, 28 of the wind turbine 12 may comprise a composite material such as fiber glass, or the like. The rotor blades 24, 26, 28 may further be coated or covered by a conductive or a non-conductive material. Each of the rotor blades 24, 26, 28 has a respective tip and a respective root on the opposite ends of a respective longitudinal axis of each of the rotor blades 24. For example, the rotor blade 24 has a tip 30 and a root 32 on the opposite ends of a longitudinal axis 34. The rotor blades 24, 26, 28 are spaced about the hub 22 to facilitate the rotating rotor 20 to enable kinetic energy to be transferred from the wind into usable mechanical energy, and subsequently, electrical energy. The rotor blades 24, 26, 28 are mated to the hub 22 by coupling the respective root to a respective slot in the hub 22. For example, the root 32 of the rotor blade 24 is mated to the hub 22 by coupling the root 32 of the blade 24 to a slot 36 in the hub 22. The internal cavities of the rotor blades 24, 26, 28 may be fully enclosed or partially enclosed. In the example of FIG. 1, the rotor blade 24 has a fully enclosed internal cavity 25.

The rotor blades 24, 26, 28 each have a respective receiving antenna 38, 40, 42. As shown in FIG. 1, the rotor blade 24 has the receiving antenna 38, the rotor blade 26 has the receiving antenna 40, and the rotor blade 28 has the receiving antenna 42. In one embodiment, the receiving antennas 38, 40, 42 comprise radio frequency receiving antennas. For ease of understanding certain embodiments are explained with reference to the rotor blade 24, however the embodiments are applicable to each of the rotor blades 24, 26, 28.

Figure 2:
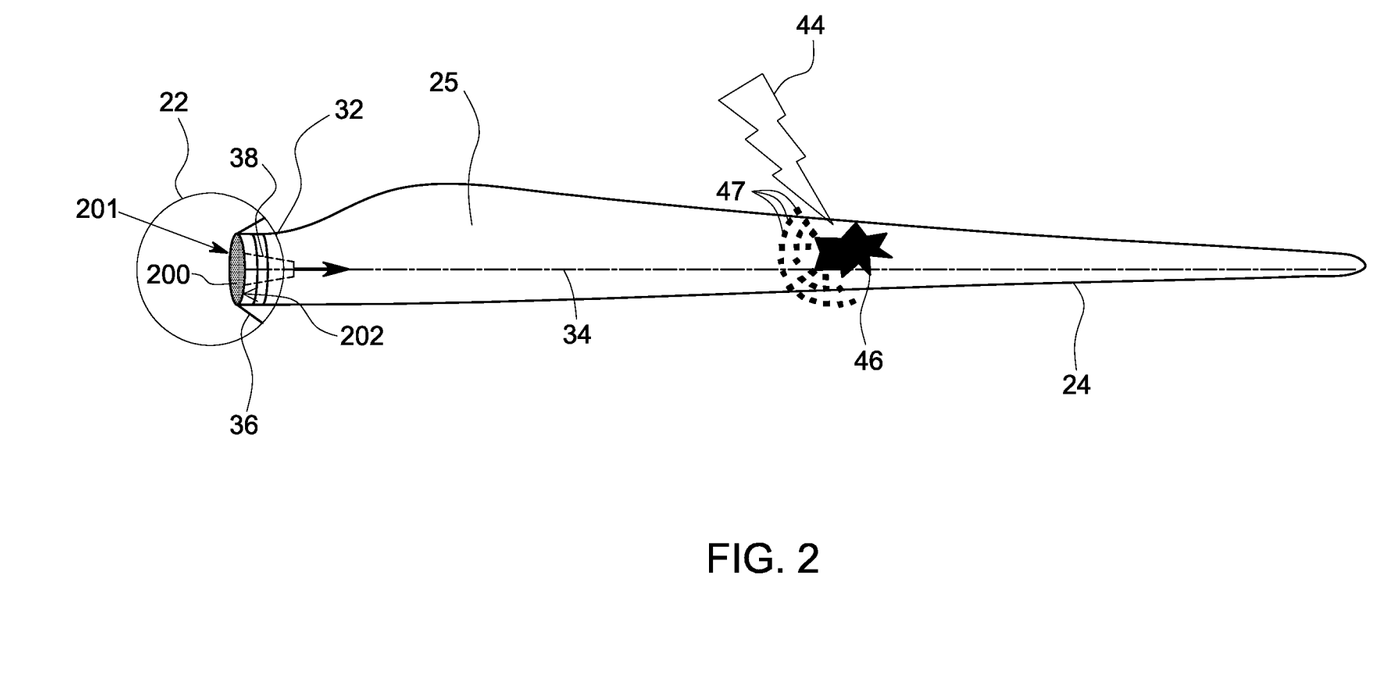
FIG. 2 shows a location of the receiving antenna of the rotor blade referred to in FIG. 1, in accordance with another embodiment of the present invention.
Figure 3:
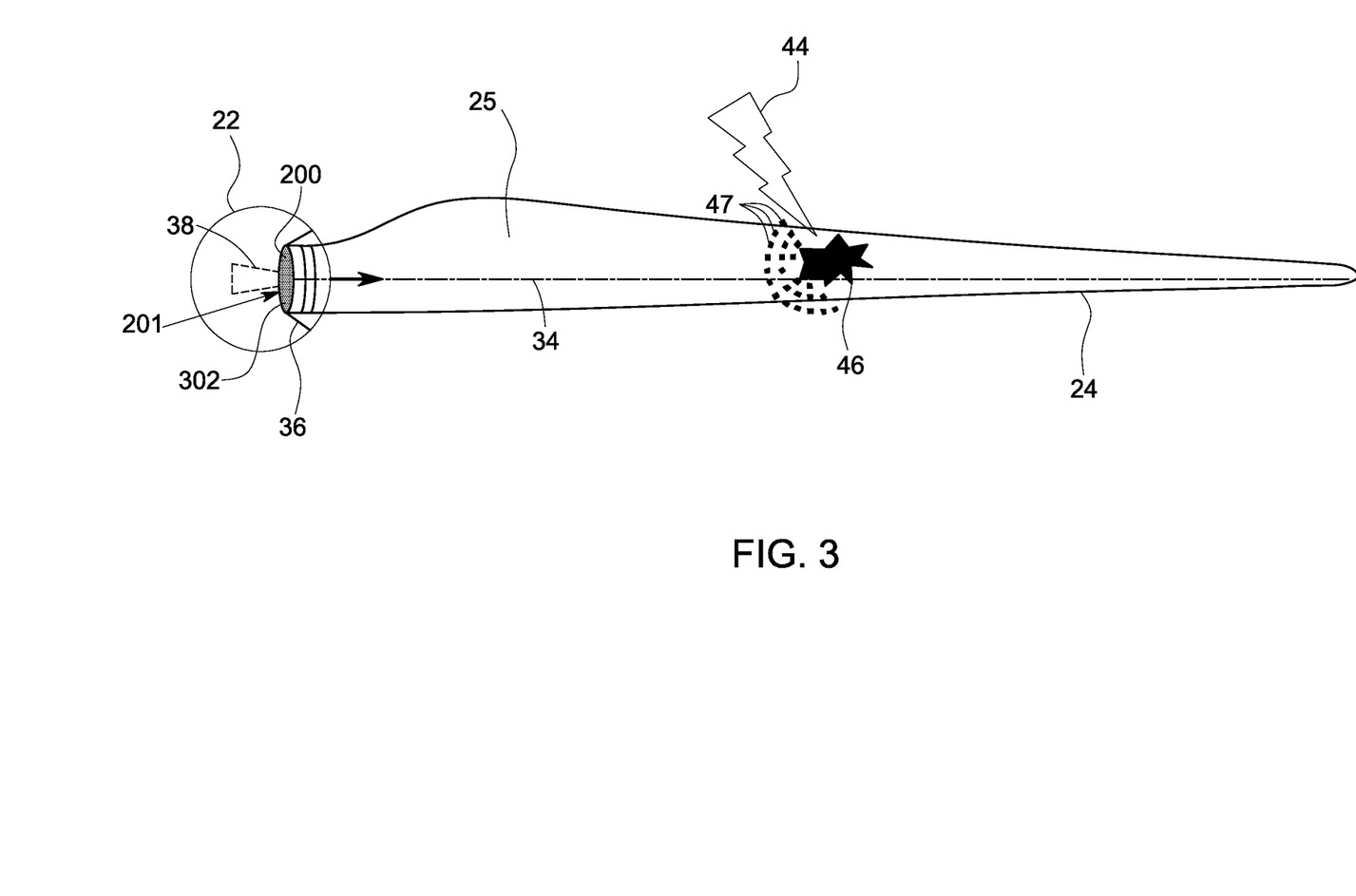
FIG. 3 shows a location of the receiving antenna of the rotor blade referred to in FIG. 1, in accordance with still another embodiment of the present invention.
Figure 4:
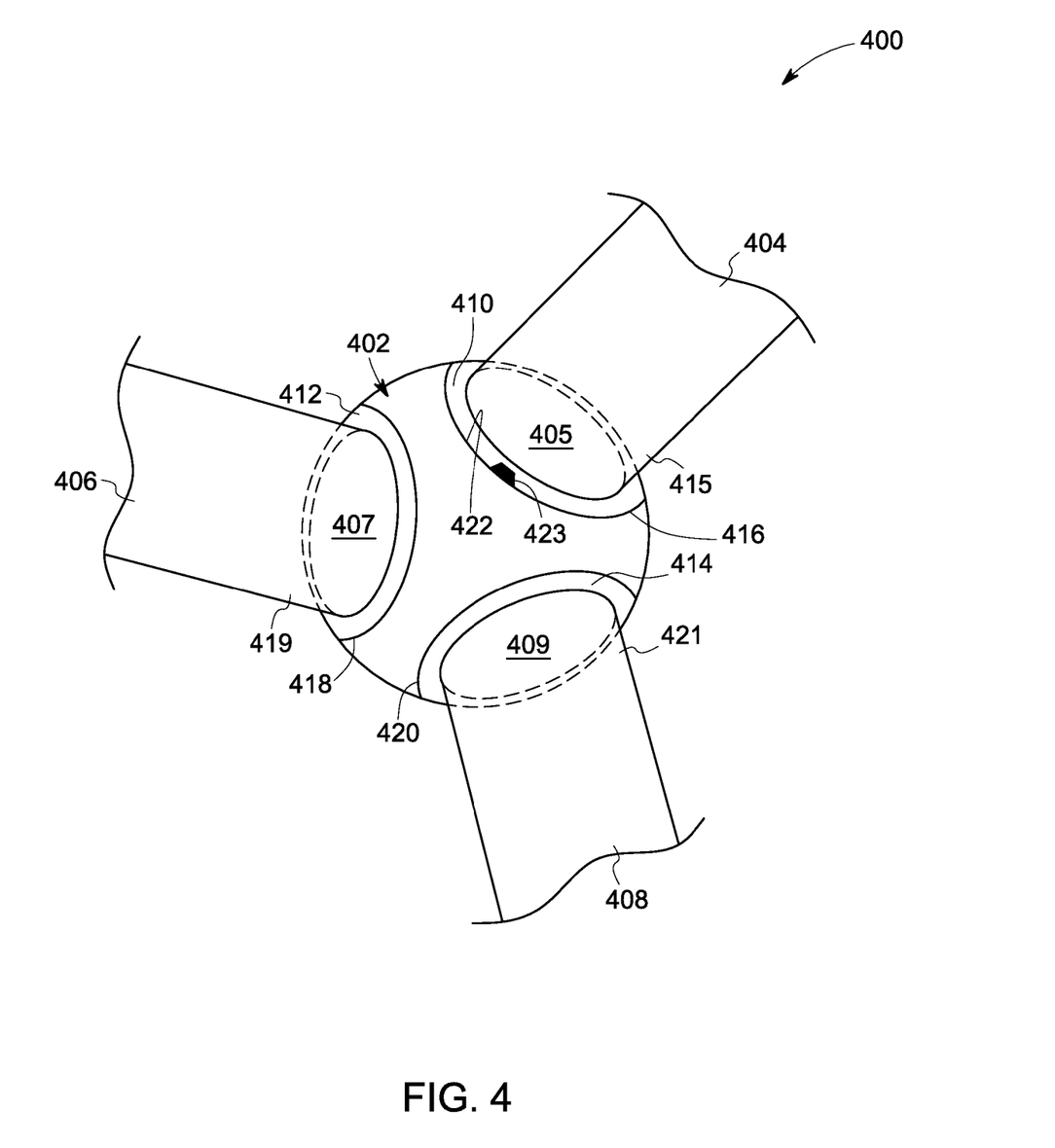
FIG. 4 is a perspective view of an exemplary hub and a plurality of rotor blades of a wind turbine system, in accordance with one embodiment of the present invention.

The receiving antennas 38, 40, 42 may be positioned in any location permitting access to radio waves within the rotor blade. In one embodiment, the receiving antenna 38 may be located inside the internal cavity 25 of the rotor blade 24. In another more specific embodiment, the receiving antenna 38 may be located inside the respective root 32 of the rotor blade 24 and inside the hub 22 (shown in FIG. 2). In still another embodiment, the receiving antenna 38 may be located outside the internal cavity 25, and in close proximity to the root 32 of the rotor blade 24. For example, the receiving antenna 38 may be located on a surface (inside or outside) of the root 32 of the rotor blade 24, and inside the hub 22. FIG. 2 shows the receiving antenna 38 as being located inside the hub 22, and on an inside surface of the rotor blade 24. FIG. 3 shows the receiving antenna 38 as being located inside the hub 22, and on the outer surface of the rotor blade 24. In another example, the receiving antenna 38 may be located on an inside surface of the hub 22, and in close proximity to the root 32 of the rotor blade 24. In one embodiment, the receiving antenna 38 may be located on the hub 22, or inside the hub 22. FIG. 4 shows an embodiment wherein a receiving antenna is located on an inside surface of a hub. In another embodiment, as shown in FIG. 1, the receiving antenna 38 may be located on an outer surface of the rotor blade 24 and near the hub 22. In this embodiment, the receiving antenna 38 may be covered by a weather proof enclosure that is transparent to electromagnetic radiation or radio frequency waves and may be situated over a transparent or semi-transparent portion of the blade.

In one embodiment, the receiving antennas 38, 40, 42 comprise directional antennas. The receiving antennas 38, 40, 42 are directed towards potential electric arc locations in the rotor blades 24, 26, 28. For example, the receiving antennas 38, 40, 42 may be directed towards the respective tip of the respective rotor blade 24, 26, 28. For example, the receiving antenna 38 is directed towards the tip 30 of the rotor blade 24 in FIGS. 2 and 3. In one embodiment, the receiving antennas 24, 26, 28 are polarized to align with an expected polarization of the electromagnetic radiation generated by the electric arc 46.

In the event of a lightning strike 44 on the rotor blade 24, the lightning strike 44 may puncture the rotor blade 24. The lightning strike 44 may puncture an outer surface of the rotor blade 24 and enter into the internal cavity 25 of the rotor blade 24. The entrance of the lightning strike 44 into the internal cavity 25 may form the electric arc 46. The electric arc 46 generates electromagnetic radiation 47. In one embodiment, the electric arc 46 generates radio frequency waves. The receiving antenna 38 receives the electromagnetic radiation 47. When the receiving antenna 38 is directed towards the tip 30, the signal to noise ratio in the electromagnetic radiation 47 is increased. The receiving antenna 38 generates and transmits signals 48 representative of the electromagnetic radiation 47 to the processing subsystem 14.

The processing subsystem 14 determines the existence of the electric arc 46 based upon the signals 48 representative of the electromagnetic radiation 47. For example, the processing subsystem 14 may compare the amplitude of the signals representative of the electromagnetic radiation 48 with one or more determined thresholds, and, when the amplitude of the signals 48 representative of the electromagnetic radiation 47 crosses the one or more determined thresholds, the existence of the electric arc 46 may be determined. If desired, prior to determining the existence of the electric arc 46, the processing subsystem 14 may process the signal representative of electromagnetic radiation 48 to remove noise.

Additionally, the processing subsystem 14 may determine the occurrence of the lightning strike 44 on the rotor blade 24 based upon the determination of the existence of the electric arc 46. For example, when the processing subsystem 14 determines that the electric arc 46 was formed in the internal cavity 25 of the rotor blade 24, the processing subsystem 14 may determine the occurrence of the lightning strike 44. Additionally, the processing subsystem 14 may determine the condition of the rotor blade 24 based upon the electromagnetic radiation 48 and/or existence of the electric arc 46 in the internal cavity 25 of the rotor blade 24.

FIG. 2 shows a location of the receiving antenna 38 of the rotor blade 24 in accordance with another embodiment of the present invention. The root 32 of the rotor blade 24 is mated to the slot 36 of the hub 22 of the wind turbine 12. In the presently shown configuration, the bottom portion 201 of the root 32 of the rotor blade 24 is covered by a partition 200 that separates the rotor blade 24 from the hub 22. While FIG. 2 shows that the bottom portion 201 of the root 32 of the rotor blade 24 is fully covered by the partition 200, in certain embodiments, the bottom portion 201 may be partially covered by a partition. The partition 200 therefore forms a part of the surface of the rotor blade 24. In the embodiment of FIG. 2, the receiving antenna 38 is located on an inner surface of the rotor blade 24, and inside the hub 22. Particularly, the receiving antenna 38 is mounted on an inner surface 202 of the partition 200, and therefore is located inside the internal cavity 25 of the rotor blade 24 and inside the hub 22.

FIG. 3 shows a location of the receiving antenna 38 of the rotor blade 24 in accordance with still another embodiment of the present invention. The receiving antenna 38 of the rotor blade 24 is located on an outside surface 302 of the rotor blade 24 and inside the hub 22. Specifically, the receiving antenna 38 is located on the outside surface 302 of the partition 200, and inside the hub 22. In the embodiment of FIG. 3, either the outside surface 302 is transparent to radio frequency waves or electromagnetic radiation or the outside surface 302 may have holes (not shown) to allow electromagnetic radiation or radio frequency waves pass through. Particularly, the receiving antenna 38 is located on an outside surface 302 of the partition 200 and inside the hub 22. While in the embodiment of FIG. 3, the bottom portion 201 of the root 32 of the rotor blade 24 is fully covered by the partition 200, in certain embodiments, the bottom portion 201 may be partially covered by a partition, and therefore the electromagnetic radiation 47 or radio frequency waves may pass through an uncovered bottom portion (not shown) of the root 32 of the rotor blade 24.

FIG. 4 is a perspective view 400 of an exemplary hub 402 and a plurality of rotor blades 404, 406, 408, in accordance with one embodiment of the present invention. In the embodiment of FIG. 4, the bottom portions 405, 407, 409 of the rotor blades 404, 406, 408, respectively are hollow and either not fully covered by a partition or comprise bottom portions 405, 407, 409 that are transparent to electromagnetic radiation or radio frequency waves. In certain embodiments, the bottom portion 405, 407, 409 of the rotor blades 406, 408, 410 may be covered by a partition such that the partition has one or more holes to enable electromagnetic radiation or radio frequency waves pass through the holes.

The hub 402 has a plurality of slots 410, 412, 414. A root 415 of the rotor blade 404 is mated to the slot 410; a root 419 of the rotor blade 406 is mated to the slot 412, and a root 421 of the rotor blade 408 is mated to the slot 414 of the hub 402. In the embodiment of FIG. 4, the slots 410, 412, 414 of the hub 402 comprise hub partition walls 416, 418, 420, respectively. Particularly, the hub 402 comprises the hub partition walls 416, 418, 420. The hub partition walls 416, 418, 420 separate the rotor blades 402, 404, 406 from the rest of the hub 402. In the embodiment of FIG. 4, a receiving antenna 423 is located on an inside surface 422 of the hub 402, and in close proximity to the root 415 of the rotor blade 404. Particularly, the receiving antenna 423 is located on an inside surface 422 of the hub partition wall 416 of the hub 402, and in close proximity to the root 415 of the rotor blade 404.

Figure 5:
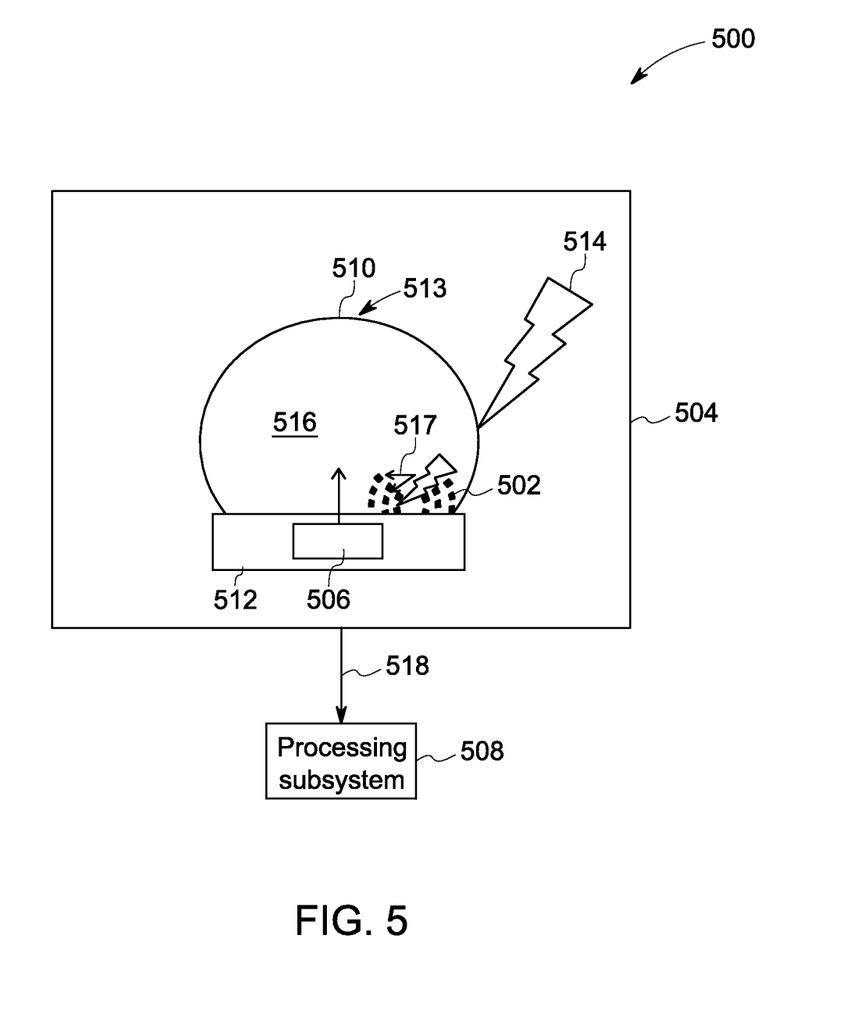
FIG. 5 is a diagrammatic illustration of a radome system including a processing subsystem to detect the existence of an electric arc in a radome, in accordance with one embodiment of the present invention.

FIG. 5 is a diagrammatic illustration of a radome system 500 to detect the existence of an electric arc 502 in a radome 504, and show a location of a receiving antenna 506 in the radome 504, in accordance with one embodiment of the present invention. The radome system 500 includes the radome 504 and a processing subsystem 508. The radome 504 is operationally coupled to the processing subsystem 508. Particularly, the receiving antenna 506 is operationally coupled to the processing subsystem 508. The receiving antenna 506, for example, is similar to the receiving antennas 38, 40, 42 referred to in FIG. 1. The radome 504 has a semi-spherical hollow cover 510 and a bottom structure 512 that serves as a base for the radome 504. In the embodiment of FIG. 5, the receiving antenna 506 is located inside the bottom structure 512 of the radome 504. In one embodiment, the receiving antenna 506 is a directional antenna directed towards potential electric arc locations in the non-conductive hollow structure. In one embodiment, the receiving antenna 506 is directed away from the bottom structure, and towards the top 513 of the radome 500. The receiving antenna 506 may further be polarized to align to the expected polarization of electromagnetic radiation 517 generated by the electric arc 502.

When a lightning strike 514 hits the radome 504, the lightning strike 514 may puncture the semi-spherical cover 510 of the radome 504, and enter into an internal cavity 516 of the radome 504. The entry of the lightning strike 514 into the internal cavity 516 of the radome 504 results in formation of the electric arc 502. The electric arc 502 generates the electromagnetic radiation 517 that is received by the receiving antenna 506. Furthermore, the receiving antenna 506 generates and transmits signals 518 representative of the electromagnetic radiation 517 to the processing subsystem 508. The processing subsystem 508 determines the existence of the electric arc 502 in the internal cavity 516 of the radome 504 based upon the signals 518 representative of the electromagnetic radiation 517. Furthermore, the processing subsystem 508 may determine the occurrence of the lightning strike 514 based upon the existence of the electric arc 502, or the signals 518 representative of the electromagnetic radiation 517. Additionally, the processing subsystem 508 may determine the condition of the radome 504 based upon the signals 518 representative of the electromagnetic radiation 517.

Figure 6:
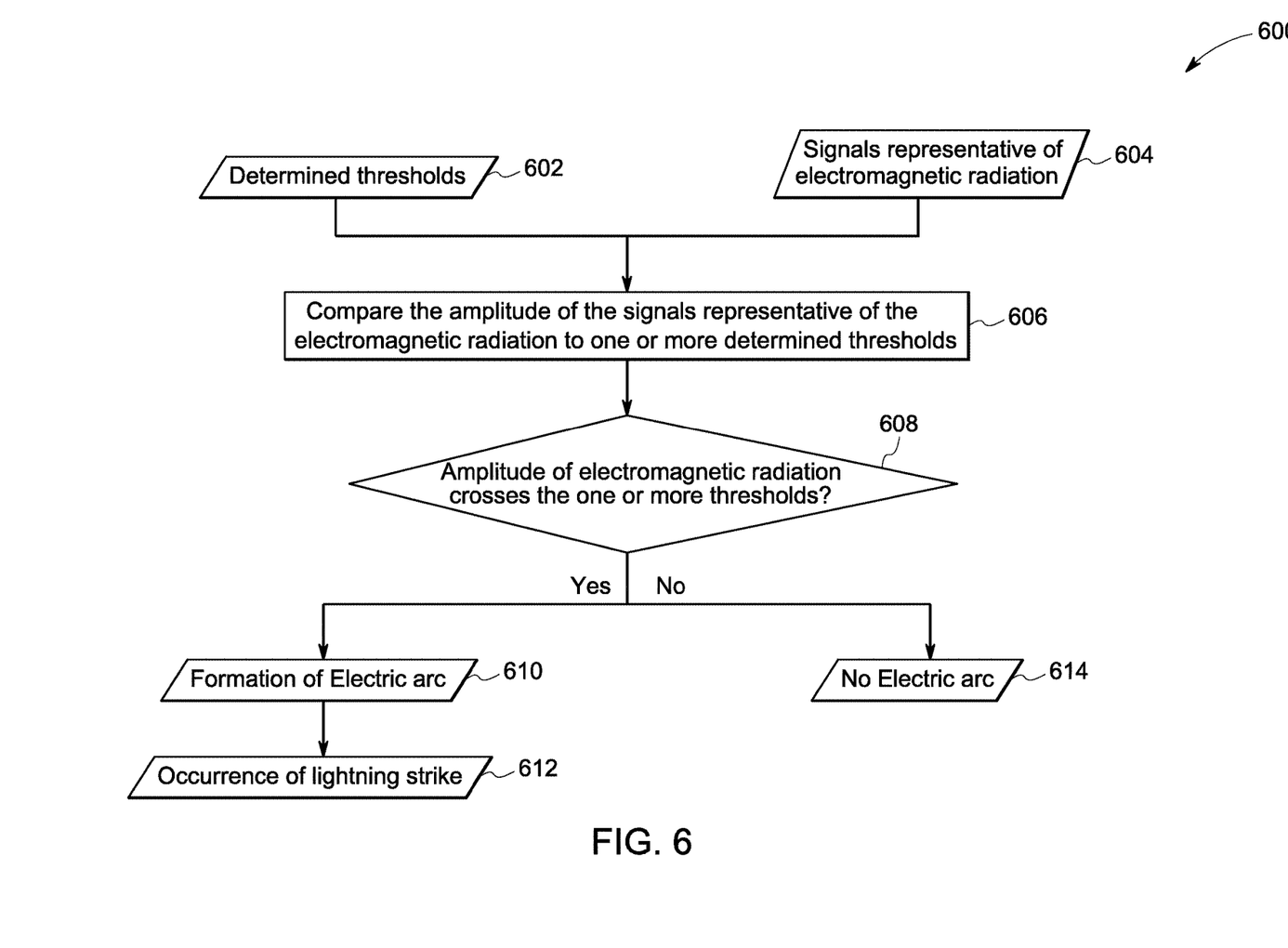
FIG. 6 is a flow chart of an exemplary method for determining the existence of an electric arc in an electrically non-conductive hollow structure, in accordance with certain embodiments of the present invention.

FIG. 6 is a flow chart that illustrates an exemplary method 600 for determining existence of an electric arc in an electrically non-conductive hollow structure, in accordance with certain embodiments of the present invention. The electrically non-conductive hollow surface, for example, may be a rotor blade, a radome, an aircraft structure, or the like. Reference numeral 602 is representative of determined thresholds that may be used to determine the existence of the electric arc and, in some embodiments, the occurrence of a lightning strike. The determined thresholds 602, for example, may be determined based upon historical electromagnetic radiation data that was received at a time stamp when an electric arc was formed and/or a lightning strike occurred. Accordingly, the determined thresholds 602 may be determined based upon historical data. Reference numeral 604 is representative of signals representative of electromagnetic radiation. The signals representative of the electromagnetic radiation, for example, may be the signals 48, 518 representative of the electromagnetic radiation 47, 517 (see FIG. 1, FIG. 2, FIG. 3, FIG. 5). The signals representative of the electromagnetic radiation, for example, may be generated by the receiving antennas 38, 40, 42, 423, 506 (see FIG. 1, FIG. 2, FIG. 3, FIG. 4, FIG. 5). The electromagnetic radiation is generated by the electric arc.

At block 606, the amplitude of the signals representative of the electromagnetic radiation 604 may be compared to one or more of the determined thresholds 602. Subsequently at step 608, a check may be carried out to determine whether the amplitude of the signals representative of the electromagnetic radiation 604 crosses the one or more of the determined thresholds 602. At step 608, when it is determined that the amplitude of the signals representative of the electromagnetic radiation 604 crosses the determined thresholds 602, at block 610, it may be declared that the electric arc is formed in the non-conductive hollow structure. If at block 610 it is determined that the electric arc is formed in the non-conductive hollow structure, at block 612 it may be determined whether there was an occurrence of a lightning strike on the non-conductive hollow structure. Referring back to block 608, when it is determined that the amplitude of the signals representative of the electromagnetic radiation 604 does not cross the determined thresholds 602, the control is transferred to block 614. At block 614, it may be declared that the electric arc is not formed in the non-conductive hollow structure.

In certain embodiments, the condition of the non-conductive hollow structure may additionally be determined based upon the electromagnetic radiation 604. Particularly, in certain embodiments, the condition of the non-conductive hollow structure may be determined based upon the signals representative of the electromagnetic radiation 604 and the determined thresholds 602. In one embodiment, each of the determined thresholds 602 may be mapped to a condition of the non-conductive hollow structure. For example, a first determined threshold in the determined thresholds 602 may be mapped to a faulty condition of the non-conductive hollow structure that indicates some time left before repair. Furthermore, a second determined threshold in the determined thresholds 602 may be mapped to more serious condition of the non-conductive hollow structure that indicates immediate repair.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electric arc detection system, the system comprising:
   a receiving antenna that receives electromagnetic radiation generated by an electric arc formed in an internal cavity of a non-conductive hollow structure; and
   a processing subsystem for determining an existence of the electric arc in the internal cavity based upon signals representative of the electromagnetic radiation,
   wherein the receiving antenna comprises a directional antenna directed towards at least one potential electric arc location in the non-conductive hollow structure.

2. The electric arc detection system of claim 1, wherein the receiving antenna comprises a radio frequency receiving antenna.

3. The electric arc detection system of claim 2, wherein the electromagnetic radiation comprises radio frequency waves.

4. The electric arc detection system of claim 1, wherein the non-conductive hollow structure comprises a hollow structure used to form a wing, fuselage, or tail of an aircraft, a hollow structure used to form a radome for an antenna, or a wind turbine rotor blade.

5. The electric arc detection system of claim 1, wherein the non-conductive hollow structure comprises a blade having a root and a tip at opposite ends along a longitudinal axis, and wherein the receiving antenna is located inside or on the root of the blade.

6. The electric arc detection system of claim 5, wherein the blade is attached to a hub, and wherein the receiving antenna is located on or inside the hub.

7. The electric arc detection system of claim 5, wherein the receiving antenna is directed towards the tip of the blade.

8. The electric arc detection system of claim 1, the receiving antenna is polarized to align with an expected polarization of the electromagnetic radiation generated by the electric arc.

9. The electric arc detection system of claim 1, wherein the non-conductive hollow structure comprises a rotor blade of a wind turbine comprising a hub.

10. The electric arc detection system of claim 9, wherein the rotor blade comprises a root and a tip at opposite ends along a longitudinal axis, and wherein the receiving antenna is located inside the hub and inside the rotor blade in close proximity to the root of the rotor blade.

11. The electric arc detection system of claim 9, wherein the rotor blade comprises a root and a tip at opposite ends along a longitudinal axis, and wherein the receiving antenna is located inside the hub and on an outer or inner surface of the root of the rotor blade.

12. The electric arc detection system of claim 1, wherein the processing subsystem is configured to determine the condition of the non-conductive hollow structure by performing a method comprising:
   comparing an amplitude of the electromagnetic radiation with a determined threshold; and determining the existence of the electric arc based upon the comparison of the amplitude of the electromagnetic radiation with the determined threshold.

13. The electric arc detection system of claim 12, wherein the processing subsystem further detects an occurrence of the lightning strike on and within the non-conductive hollow structure based upon the determination of the existence of the electric arc in the internal cavity of the non-conductive hollow structure.

14. The electric arc detection system of claim 1, wherein the processing subsystem further determines the condition of the non-conductive hollow structure based upon the electromagnetic radiation and a determined threshold.

15. The electric arc detection system of claim 1, wherein the non-conductive hollow structure comprises a radome comprising a bottom structure, wherein the receiving antenna is located inside the bottom structure of the radome, and the receiving antenna is directed away from the bottom structure and towards the top of the radome.

16. A wind turbine system, comprising:
a wind turbine hub;
a plurality of rotor blades, each of the plurality of rotor blades comprising a respective root and a respective tip at opposite sides along a respective longitudinal axis;
a plurality of radio frequency antennas, each of the plurality of radio frequency antennas located inside the wind turbine hub and inside a root of a respective rotor blade of the plurality of rotor blades and positioned to receive radio frequency waves generated by one or more electric arcs in a respective internal cavity of the respective rotor blade; and
a processing subsystem for determining an existence of the one or more electric arcs in the respective internal cavity of the plurality of rotor blades based upon the radio frequency waves.

17. The wind turbine system of claim 16, wherein the plurality of radio frequency antennas comprises directional antennas at least three of which are each respectively directed towards a respective tip of a respective rotor blade.

18. A method, comprising:
receiving signals representative of radio frequency waves from a radio frequency receiving antenna located inside a non-conductive hollow structure;
comparing an amplitude of the signals representative of the radio frequency waves with a determined threshold; and
determining an existence of an electric arc in an internal cavity of the non-conductive hollow structure based upon the comparison of the amplitude of the signals representative of the radio frequency waves with the determined threshold.

19. The method of claim 18, wherein the non-conductive hollow structure comprises a wind turbine.

* * * * *